United States Patent Office 2,811,525
Patented Oct. 29, 1957

2,811,525

2-AMINO-4-ALKYL, ARYL, AND ARALKYL-MERCAPTOALKYLENEAMINOPYRIMIDINES AND 2-AMINO-4-ALKYL, ARYL, AND ARALKYL-6-ALKYL - MERCAPTOALKYLENEAMINOPYRIMIDINES

William Oroshnik, Plainfield, and Robert Arthur Mallory, Branchburg Township, Somerset County, N. J., assignors to Ortho Pharmaceutical Corporation, a corporation of New Jersey No Drawing. Application March 17, 1955,
Serial No. 495,062

7 Claims. (Cl. 260—256.5)

This invention relates to 2 - amino - 4 - alkyl, aryl, or aralkyl-mercaptoalkyleneaminopyrimidines, as well as 2-amino-4-alkyl, aryl, or aralkyl-mercaptoalkyleneaminopyrimidines which are substituted in the sixth position with an alkyl group, and salts thereof.

The novel compounds of this invention may be represented by the following graphic formula:

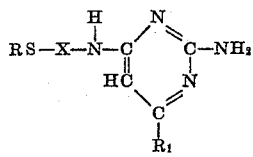

R in the formula represents a lower alkyl radical, preferably having not more than six carbon atoms, an aryl radical, or an aralkyl radical, preferably having not more than eight carbon atoms. The aralkyl radical may have one chlorine atom on the benzene ring. $R_1$ in the formula represents hydrogen or a lower alkyl radical preferably having not more than six carbon atoms, and X represents a lower alkylene straight or branched-chain bridge, preferably having not more than six carbon atoms.

The new and novel derivatives of pyrimidines to which the present invention is directed may be prepared by heating in solution in an organic solvent, a mixture of an alkyl, aryl, or aralkylmercaptoalkyleneamine and 2-amino-4-chloropyrimidine. The alkyl, aryl, or aralkylmercaptoalkyleneamine may be prepared by the reaction of an alkyl, aryl, or aralkylmercaptan with a bromoalkyleneamine salt, such as the hydrobromide salt, in the presence of sodium hydroxide; by the reaction of an alkyl, aryl, or aralkylmercaptan with an alkyleneimine; or by the reaction of an alkyl, aryl, or aralkylmercaptan with a bromoalkylenephthalimide. Salts may be prepared by reacting the pyrimidine bases prepared as above with mineral or organic acids, e. g. hydrochloric acid, sulphuric acid, succinic acid, tartaric acid, mandelic acid, or acetic acid.

For the purpose of illustration, the following examples are set forth to illustrate the novel compounds of the invention but are not to be construed as limiting the spirit of the invention or its scope.

EXAMPLE I

*2-amino-4-(beta-benzylmercaptoethyl)amino-pyrimidine*

25 grams of benzyl mercaptan and eight grams of sodium hydroxide were dissolved in 200 ml. of 50 percent aqueous ethanol. The solution was cooled to 5° C. and 20 grams of bromoethylamine hydrobromide were added. The solution was allowed to warm to room temperature and after standing for eighteen hours the alcohol was removed by distillation under reduced pressure. A dilute hydrochloric acid solution prepared by adding 15 ml. of hydrochloric acid to 100 ml. of water was added to the residue obtained by the removal of alcohol. Unreacted benzyl mercaptan was removed from the acidic solution by extraction with ether and the resulting mercaptan-free solution was made alkaline with sodium hydroxide and extracted three times with 75 ml. of ether. The combined ether extracts were dried over anhydrous potassium carbonate, filtered, and distilled following removal of the ether by distillation under reduced pressure. The distillation was conducted at a pressure of 18 mm. of mercury and the benzylmercaptoethylamine distilled at 156° to 157° C.

100 grams of benzylmercaptoethylamine and 50 grams of 2-amino-4-chloropyrimidine in solution in 400 ml. of isopropanol were refluxed for fifteen hours. The alcohol was removed by distillation under reduced pressure and the residue was dissolved in a dilute hydrochloric acid solution obtained by adding 50 ml. of concentrated hydrochloric acid to 750 ml. of water. 10 grams of activated charcoal was added to the hydrochloric acid solution and the solution was stirred for two hours and filtered. The solution was made alkaline by the addition of concentrated sodium hydroxide solution and the insoluble oil which separated was removed by extraction with ether. The ether solution was dried over anhydrous potassium carbonate, filtered, and the ether was removed by distillation under reduced pressure. The residue obtained after the removal of the ether was distilled at 0.01 mm. of mercury and 80.7 grams of 2-amino-4-(beta-benzylmercaptoethyl) aminopyrimidine having a boiling point of 200°–210° C. at that pressure were obtained.

10 grams of 2-amino-4-(beta-benzylmercaptoethyl) aminopyrimidine and five grams of succinic acid were dissolved in 250 ml. of hot 95 percent aqueous ethanol. The solution was cooled and the precipitated 2-amino-4-(beta-benzylmercaptoethyl) aminopyrimidine succinate was removed by filtration and washed once with cold 95 percent ethanol. 11 grams of succinate salt having a melting point of 151.5° to 152° C. were obtained.

Calculated for $(C_{13}H_{16}N_4S)_2 \cdot (C_4H_6O_4)$:

| | Percent |
|---|---|
| Carbon | 56.40 |
| Hydrogen | 6.00 |
| Nitrogen | 17.54 |

Found:

| | |
|---|---|
| Carbon | 56.47 |
| Hydrogen | 6.03 |
| Nitrogen | 17.63 |

A mixture of 25 grams of 2-amino-4-(beta-benzylmercaptoethyl)aminopyrimidine succinate, prepared as above, 250 cc. of benzene and 250 cc. of two percent aqueous sodium hydroxide solution were stirred at 45° C. for thirty minutes. The mixture was cooled to 10° C. and stirred for an hour at this temperature at which time a mass of crystals deposited from the benzene layer. The crystalline 2 - amino - 4 - (beta - benzylmercaptoethyl) aminopyrimidine monohydrate was removed by filtration, washed with water and then with benzene and allowed to dry in air of about 60–75% humidity.

Calculated for $C_{13}H_{16}N_4S \cdot H_2O$:

| | Percent |
|---|---|
| Carbon | 56.10 |
| Hydrogen | 6.52 |

Found:

| | |
|---|---|
| Carbon | 56.51 |
| Hydrogen | 6.43 |

The crystalline hydrate was converted to the free amine by allowing it to stand in a vacuum desiccator for 48 hours, at which time it had lost its crystalline structure and was an oil.

Calculated for $C_{13}H_{16}N_4S$:                    Percent
    Carbon _____ 59.98
    Hydrogen _____ 6.20
Found:
    Carbon _____ 59.98
    Hydrogen _____ 6.40

9 grams of 2-amino-4-(beta-benzylmercaptoethyl)-aminopyrimidine were dissolved in 50 ml. of a two to one by weight solution of isopropanol and benzene was added to a solution of 3.40 grams of concentrated sulphuric acid in 14 ml. of a two to one solution of isopropanol and benzene. The final solution was allowed to stand for sixteen hours at 5° C. At the end of this time the crystalline sulphate salt was completely precipitated. The precipitated salt was removed by filtration and recrystallized from a one to one solution of isopropanol and ethanol. 8.7 grams of recrystallized 2-amino-4-(beta-benzylmercaptoethyl)aminopyrimidine sulphate, having a melting point of 149–150° C. were obtained.

Calculated for $(C_{13}H_{16}N_4S)_2 \cdot H_2SO_4$:         Percent
    Carbon _____ 50.47
    Hydrogen _____ 5.45
Found:
    Carbon _____ 50.70
    Hydrogen _____ 5.71

EXAMPLE II
2-amino-4-(beta-para-chlorobenzylmercaptoethyl) aminopyrimidine 30 grams of ethyleneimine were added to a solution of 81 grams of para-chlorobenzylmercaptan in 250 ml. of 95 percent aqueous ethanol. The solution was allowed to stand for two hours and was then saturated with gaseous hydrogen chloride and evaporated to dryness under reduced pressure. The hydrochloride salt that remained was dissolved in 250 cc. of water and made alkaline by the addition of concentrated aqueous sodium hydroxide solution. An insoluble oil was formed when the solution was made alkaline and was removed by extraction with three 100 cc. portions of ether. The combined ether extracts were dried over magnesium sulfate and the ether was removed by distillation under reduced pressure. The residue was distilled at a pressure of 0.02 millimeter of mercury and 80.9 grams of para-chlorobenzylmercaptoethylamine, having a boiling point of 96° C.–98° C., were obtained.

A mixture of 27.1 grams of para-chlorobenzylmercaptoethylamine, 19.4 grams of 2-amino-4-chloropyrimidine and 250 cc. of absolute ethanol was refluxed for sixteen hours. Five hundred cc. of water were added, the mixture was filtered and the alcohol was removed by evaporation under reduced pressure. Excess solid sodium hydroxide was added to the aqueous solution remaining, and the insoluble oil formed was extracted with ether. The ether solution was dried over anhydrous potassium carbonate and filtered. 39.5 grams of 2-amino-4-(beta-para-chlorobenzylmercaptoethyl)aminopyrimidine in the form of an oil were obtained upon removal of the ether under reduced pressure. The 2-amino(beta-para-chlorobenzylmercaptoethyl)aminopyrimidine was added to a solution of 16 grams of succinic acid in 500 ml. of ethanol. The solution was then heated with five grams of activated charcoal for one hour and filtered hot. The filtrate was concentrated under vacuum to 150 cc. and, on cooling, deposited a mass of crystals. The crystals were filtered off and recrystallized from ethanol. 43.2 grams of the succinate salt of 2-amino-4(beta-para-chlorobenzylmercaptoethyl)aminopyrimidine, having a melting point of 140° C. to 141° C., were obtained.

Calculated for $C_{13}H_{15}N_4SCl \cdot C_4H_6O_4$:         Percent
    Carbon _____ 49.45
    Hydrogen _____ 5.13
Found:
    Carbon _____ 49.44
    Hydrogen _____ 5.19

EXAMPLE III
2-amino-4-(delta-benzylmercaptobutyl)aminopyrimidine

A solution of 91 grams of N-(delta-bromobutyl)phthalimide in solution in 300 ml. of 95 percent aqueous ethanol was added to a solution of seventeen grams of sodium hydroxide and 55 grams of benzylmercaptan dissolved in 200 ml. of 95 percent aqueous ethanol. The solution was refluxed for six hours and ethanol was removed by evaporation at atmospheric pressure. 300 ml. of water was added to the residue and the aqueous solution was extracted with three 100 ml. portions of ether. The combined ether extracts were dried over magnesium sulfate and the ether was removed under reduced pressure. The residue was dissolved in one liter of 95 percent aqueous ethanol and 30 grams of an 85 percent solution of hydrazine hydrate were added to the ethanol solution. The resulting solution was refluxed for three hours, cooled to room temperature, and 55 ml. of concentrated hydrochloric acid solution were added. The phthalyl hydrazide which was precipitated upon the addition of hydrochloric acid was removed by filtration and the filtrate was evaporated to dryness at atmospheric pressure, dissolved in 200 cc. of water, and the aqueous solution was acidified by the addition of concentrated hydrochloric acid. Unreacted benzylmercaptan was removed by extraction with ether and the resulting aqueous solution was made strongly alkaline by the addition of concentrated aqueous sodium hydroxide solution. The alkaline solution was extracted with three 100 ml. portions of ether and the combined ether extracts were dried over anhydrous potassium carbonate, evaporated to dryness and distilled.

48.8 grams of delta-benzylmercaptobutylamine, having a boiling point of 165°–168° C. at a pressure of eleven millimeters of mercury were obtained.

Calculated for $C_{11}H_{17}NS$:                    Percent
    Carbon _____ 67.64
    Hydrogen _____ 8.77
Found:
    Carbon _____ 67.36
    Hydrogen _____ 8.77

A mixture of 25.8 grams of 2-amino-4-chloropyrimidine, 48.8 grams of delta-benzylmercaptobutylamine and 500 cc. of anhydrous ethanol was refluxed for eighteen hours. The alcohol was then removed by distillation under reduced pressure and the residue stirred for a half hour with excess ten percent aqueous sodium hydroxide solution. The precipitated oil was extracted with ether, dried over anhydrous potassium carbonate, filtered, and distilled. 42.5 grams of 2-amino-4-(delta-benzylmercaptobutyl)aminopyrimidine, having a boiling point of 240°–245° C. at a pressure of 0.6 millimeter of mercury, were obtained.

The distilled product was dissolved in 300 cc. of hot absolute ethanol containing ten grams of succinic acid and the resulting clear solution allowed to cool at room temperature. The crystalline substance was removed by filtration. 29.2 grams of the succinate salt of 2-amino-4-(delta-benzylmercaptobutyl)aminopyrimidine, having a melting point of 133.5° C. to 134.5° C., were obtained.

Calculated for $(C_{15}H_{20}N_4S)_2 (C_4H_6O_4)$:         Percent
    Carbon _____ 58.76
    Hydrogen _____ 6.67
Found:
    Carbon _____ 58.53
    Hydrogen _____ 6.83

EXAMPLE IV

The novel compounds of this invention were tested for local anesthetic activity by the rabbit cornea and frog's foot methods.

By the rabbit cornea method for testing local anesthetic activity a wink reflex is elicited by putting pressure on the cornea with a nylon bristle until the bristle just begins to bend, the stimuli consisting of five rapid pressure impulses with the bristle. A rabbit's eye is bathed with a solution of the novel compound to be tested for thirty seconds and the cornea is stimulated periodically thereafter to determine the duration of the anesthesia, the endpoint of anesthesia being taken as the first reappearance of the wink reflex.

In the frog's foot method of determining local anesthetic activity, the reflex time of a decapitated frog was determined by immersing a foot of the frog in 0.5 percent aqueous hydrochloric acid solution, the normal reflex time being two to five seconds. The acid was rinsed off and the frog's foot was then immersed for twenty minutes in a dilute aqueous solution of the compound to be tested. The compound was rinsed off and the frog's foot was then immersed in 0.5 percent aqueous hydrochloric acid solution, the endpoint of anesthesia being taken as the reappearance of reflex action.

The results of the determination of the local anesthetic activity of the novel compounds by the rabbit cornea and frog's foot methods are given in the table below; the results of the rabbit cornea test appear in column I and represent the concentration of the compound tested and the elapsed time before a wink-reflex reappears. The results of the frog's foot test appear in column II and represent the minimum effective concentration which prevents a recurrence of a reflex of a frog's foot.

TABLE

| | Column I | Column II |
|---|---|---|
| 2-Amino-4-(beta-hexylmercaptoethyl)aminopyrimidine. | 25-86 minutes for 0.5% solution. | |
| 2-Amino-4-(beta-phenylmercaptoethyl)aminopyrimidine. | | 0.25 percent solution. |
| 2-Amino-4-(beta-benzylmercaptoethyl)aminopyrimidine. | 63 minutes for 1.0% solution. | Do. |
| 2-Amino-4-(beta-parachlorobenzylmercaptoethyl)aminopyrimidine. | | 0.125 percent solution. |
| 2-Amino-4-(beta-phenethylmercaptoethyl)aminopyrimidine. | 14-42 minutes for 0.5 per cent solution. | |
| 2-Amino-4-(gamma-benzylmercaptopropyl)aminopyrimidine. | 27-66 minutes for 0.5 per cent solution. | |
| 2-Amino-4-(delta-benzylmercaptobutyl)aminopyrimidine. | | 0.5 percent solution. |
| 2-Amino-4-(epsilon-benzylmercaptoamyl)aminopyrimidine. | | Do. |
| 2-Amino-4-(beta-benzylmercaptoethyl)amino-6-amylpyrimidine. | | Do. |

What is claimed is:

1. A compound selected from the group consisting of compounds having the structural formula:

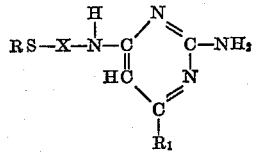

in which R is a radical selected from the class consisting of lower alkyl, monocyclic aryl monochloro monocyclic aryl, and lower monocyclic aralkyl radicals; $R_1$ is selected from the class consisting of hydrogen and a lower alkyl radical; and X is a bivalent radical selected from the class consisting of lower alkylene straight and branched-chain radicals; and non-toxic salts thereof with acids.

2. A compound selected from the group consisting of compounds having the structural formula:

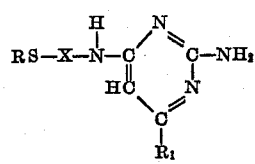

in which R is a radical selected from the class consisting of alkyl radicals having not more than eight carbon atoms, monocyclic aryl mono chloro aryl monocyclic and lower monocyclic aralkyl radicals; $R_1$ is selected from the class consisting of hydrogen and alkyl radicals having not more than six carbon atoms; and X is a bivalent radical selected from the class consisting of alkylene straight and branched-chain radicals having not more than six carbon atoms; and non-toxic salts thereof with acids.

3. 2-amino-4-(beta-benzylmercaptoethyl)aminopyrimidine.

4. A non-toxic salt of 2-amino-4-(beta-benzylmercaptoethyl)aminopyrimidine with an acid.

5. 2-amino-4-(beta-para-chlorobenzylmercaptoethyl)-aminopyrimidine.

6. A non-toxic salt of 2-amino-4-(beta-para-chlorobenzylmercaptoethyl)aminopyrimidine, with an acid.

7. A non-toxic salt of 2-amino-4-(delta-benzylmercaptobutyl)aminopyrimidine with an acid.

No references cited.